United States Patent [19]
Jensen

[11] 3,711,629
[45] Jan. 16, 1973

[54] CABLE TERMINUS FOR ENCAPSULATED LOAD COILS
[75] Inventor: William T. Jensen, Stratford, Ontario, Canada
[73] Assignee: Superior Continental Corporation, Hickory, N.C.
[22] Filed: July 16, 1971
[21] Appl. No.: 163,373

[52] U.S. Cl. ............... 174/76, 174/52 PE, 174/77 R
[51] Int. Cl. .............................................. H02g 15/04
[58] Field of Search...174/20, 23 R, 52 PE, 60, 65 R, 174/65 SS, 70 S, 74 R, 75 R, 75 B, 76, 77 R, 87, 88 R, 91, 93; 178/46

[56] References Cited

UNITED STATES PATENTS

| 1,228,155 | 5/1917 | Williams | 174/76 X |
| 2,264,803 | 12/1941 | Jacobs | 174/76 X |
| 2,282,239 | 5/1942 | Opsahl | 174/77 R X |
| 3,209,069 | 9/1965 | Ruddell et al. | 174/76 X |

FOREIGN PATENTS OR APPLICATIONS

| 177,610 | 3/1922 | Great Britain | 174/76 |
| 1,124,985 | 8/1968 | Great Britain | 174/76 |

Primary Examiner—Laramie E. Askin
Attorney—Roy B. Moffitt

[57] ABSTRACT

Disclosed herein is a novel telecommunication cable terminus, adapted to be connected to a container in which telecommunication loading coils are disposed. It is preferred that the outside terminal portion of that cable stub used with the herein disclosed terminus be divided into two portions, one portion being serrated and a second portion being flame treated. These cable stub terminal portions are longitudinally surrounded by and spaced apart from a tubular enclosure to form an annular space between the cable stub terminal portions and the enclosure. A sidewall forming first and second spaced-apart openings, the first opening being larger than the second opening whereby the sidewall converges from the first to the second opening, make up the tubular enclosure. Disposed in that annulus space formed in part by the second tubular plastic sheath terminal portion is a resilient annulus plug under compression. A thermohardenable plastic annulus occupies that part of the annulus formed, in part, by the first tubular plastic terminal portion. The tubular enclosure itself is fastened to a container, in which loading coil or other electronic or electrical gear is disposed and the thermohardenable plastic supra extends.

12 Claims, 3 Drawing Figures

WILLIAM T. JENSEN
INVENTOR.

BY Roy B. Mott
ATTORNEY

CABLE TERMINUS FOR ENCAPSULATED LOAD COILS

BACKGROUND OF THE INVENTION

The instant invention relates to encapsulated wound loading coils, and more particularly to the construction of a cable stub entry terminus used therewith. Loading coils are normally used in low voltage level applications, such as in connection with voice transmission lines (telecommunication systems).

Because a loading coil assembly is used either in aerial or direct buried installations, it is therefore imperative to control not only the electrical but also the mechanical properties associated therewith, namely water penetration. Consequently, the design and encapsulation of these assemblies require that virtually no change occurs in the coil operating parameters due to the presence of water or water vapor inside or outside of the container. In the main, it is the primary purpose and the fundamental object of the instant invention to provide a water proof assembly, adapted to be placed underneath the soil or in an aerial installation, either as a part of or not as a part of a pressurized telecommunication network. The main goal achieved by the disclosed assembly is the exclusion of water or water vapor from the load coils themselves. A secondary goal, achieved by the hereinafter disclosed cable terminus, is an economically feasible simple cable terminus structure and load coil encapsulation method that accomplishes the main goal of water exclusion in a simple, but effective manner.

Another object of the instant invention is to provide a shell structure, which when filled with an encapsulate, is capable of withstanding a momentary high voltage pulse, which may occur at times, for example, over the above-mentioned transmission lines or from an outside source.

More particularly, the following drawings and disclosure describe an encapsulated load coil in thermohardenable (epoxy) compound and addresses itself even more particularly to the method of manufacturing and placing coils in a fiberglass container prior to encapsulation. Because of the encapsulation structure hereinafter disclosed, no external cable support is required, as is usually the case in other cases. For example, see U.S. Letters Pat. No. 3,569,608, Element 3 of FIG. 1 thereof.

Other objects, advantages and features of the present invention will become apparent from the following detailed description, one embodiment which is present in conjunction with the drawings, in which.

DESCRIPTION OF THE PREFERRED EMBODIMENT

Figure 1:
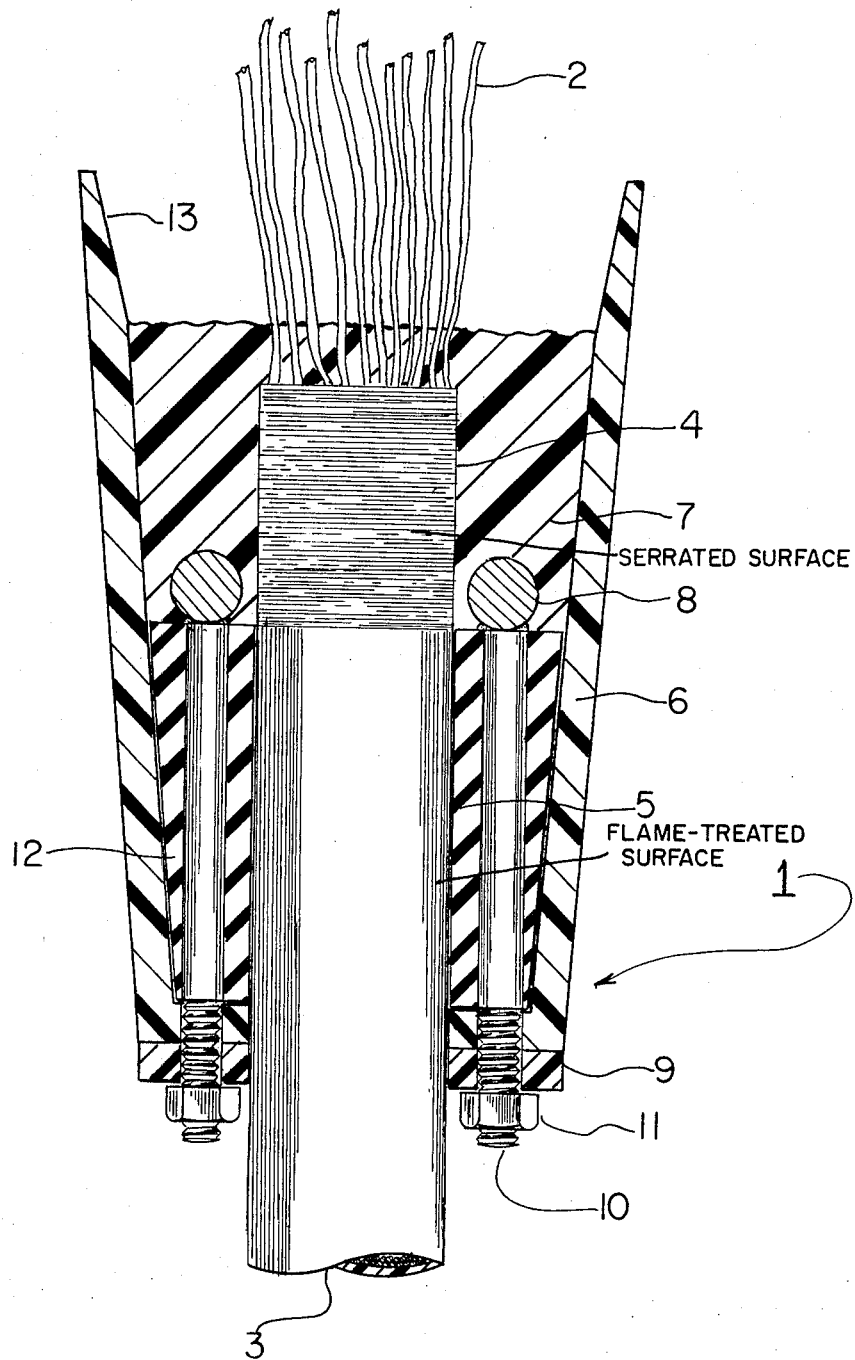
FIG. 1 shows the cable entry terminus.
Figure 2:
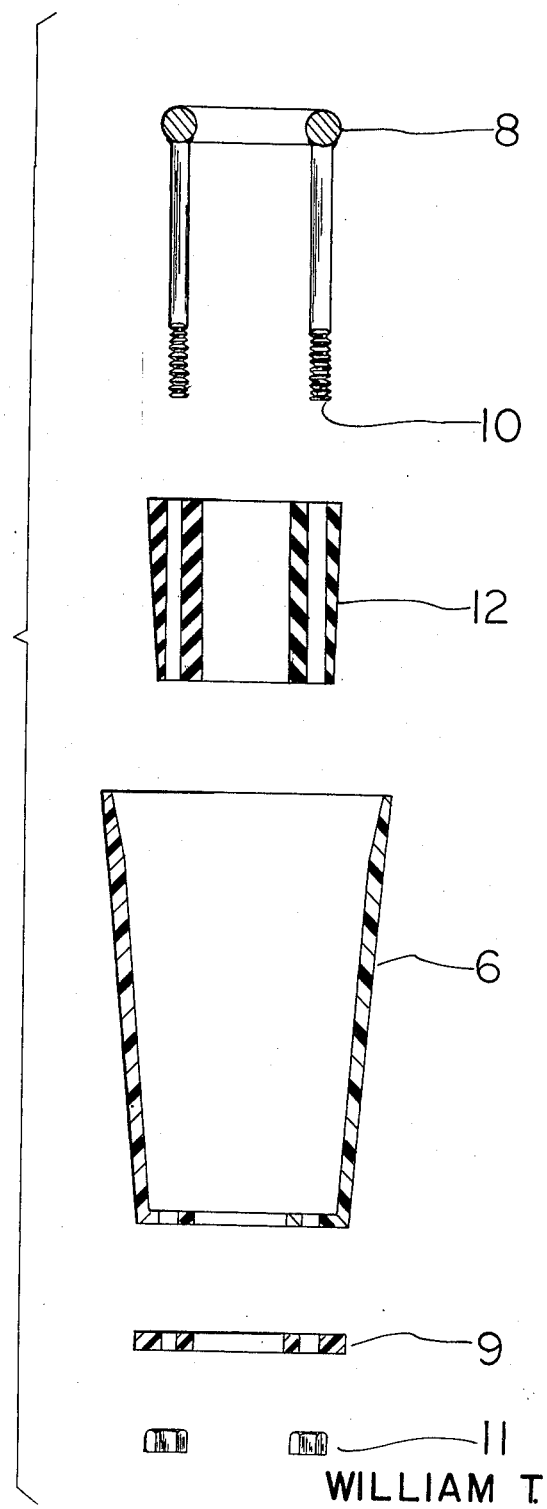
FIG. 2 shows the individual components composing the major elements necessary for assembling the cable terminus terminal of FIG. 1; and, FIG. 3 is a fragmented view of encapsulated load coils in a case attached to the cable terminus shown in FIG. 1.

Reference 1 of FIG. 1 shows the over all cross sectional view of the cable terminus assembly. The cable stub, made up in part of an outer plastic sheath 3 and insulated electrical conductors 2, is disposed in a nested fashion inside a tubular container 6, which has a first and second opening. One of these openings is larger than the other, thereby providing for converging sidewall 6. A terminal portion of plastic cable sheath 3 is divided into two parts. The first part, shown by reference character 5, has been flame treated, i.e., a hot flame has been applied to the plastic cable sheath 3. A second terminal portion, shown by reference character 4, is serrated i.e., the surface of plastic sheath 3 is indented either by a hot iron or some sharp instrument that cuts either regular or irregular indentations in an otherwise smooth plastic cable sheath 3.

That space between the tubular enclosure 6 and the flame treated terminal portion of cable 3, see reference character 5, is occupied by a resilient annulus plug 12. This annulus plug can be made of polyurethane rubber or other resilient material. Annulus 12 has a compression means made up of elements 10 and 8, formed by annulus ring 8 welded to two elongated members 10, which are disposed approximately parallel to the longitudinal axis of cable sheath 3. As shown, the terminal portions of elongated members 10 are threaded and protrude beyond the terminal portion of tubular enclosure 6. A retaining ring, shown by element 9, made of some plastic or metal is disposed around cable sheath 3 in the manner shown, and abuts one terminal portion of tubular enclosure 6. Nuts 11 are provided to fit on the threaded portions of elongated members 10, and when significantly tight, cause annulus 12 to be in compression, due to the coaction of annulus ring 8 and retaining ring 9.

Epoxy material, or any other thermohardenable material, is disposed in that annulus formed, in part, by the serrated portion of cable sheath 3 and tubular enclosure 6. The innermost terminal portion 13 of tubular enclosure 6 sidewall is provided for attachment (gluing) of terminus 1 to container 14 — not shown in FIG. 1 — in which the load coils are disposed. Electrical conductors 2, nested inside of cable sheath 3, are attached to load coils 15 disposed in container 14, hereinafter described, the terminal portion of which is attached to beveled edge 13 of sidewall 6.

Figure 3:
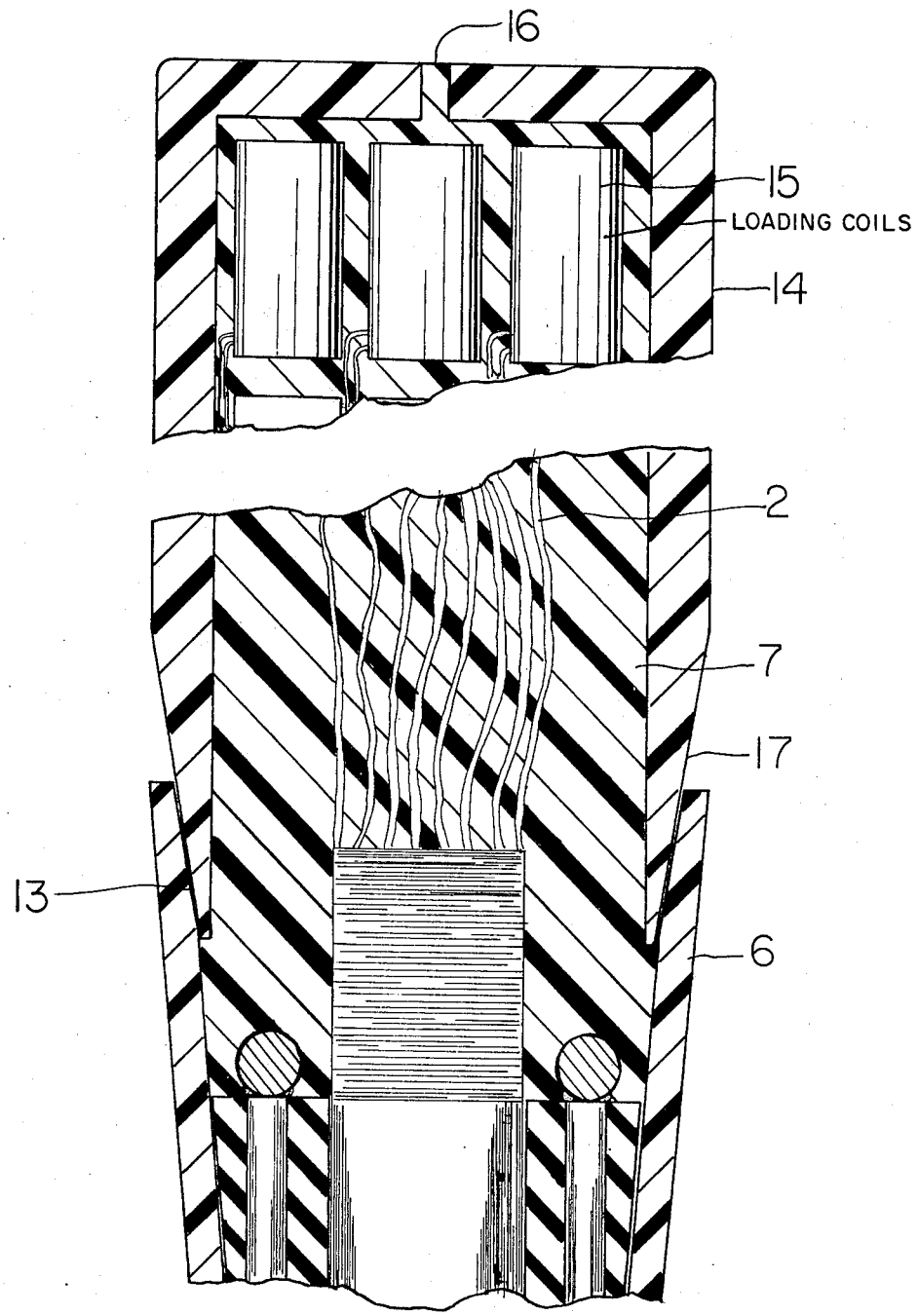

In FIG. 3, load coil units 15 are shown encapsulated by epoxy 7, said epoxy being continuous from the body of enclosure 14 up through and into tubular enclosure 6. Reference character 16 indicates an opening in the bottom of container 14, and is used, as hereinafter explained, to introduce epoxy 7 into containers 6 and 14. Beveled surface 17 of container 14 is affixed (glued) to beveled surface 13 of tubular enclosure 6.

METHOD OF ASSEMBLY

A cable stub 3 is first provided, for example, a cable having a polyethylene sheath enclosing polyethylene insulated electrical conductors nested therein. This cable is then prepared by exposing the electrical conductors 2 to a sufficient length so as to allow wiring of these conductors to load coils 15 in a later operation. A grounding wire, not shown, may be attached, by means of soldering it to an exposed portion of the cable metal shielding (not shown). The outer sheath of cable 3 is configurated by means of a hot serrating tool for approximately 2 inches. Then, the next 4 to 5 inches of the cable sheath are flame treated. The flame treated and serrated terminal portions of cable 3, reference characters 5 and 4 respectively, afford surfaces whereby a urethane plug 12 and an epoxy 7 will effectively bond to the cable sheath 3.

Cable 3 is then inserted through the largest opening in tubular enclosure 6. Retaining ring 9 is slid down on the cable on to the outer surface of the top (smallest opening) of the tubular enclosure 6. Subsequently, a tapered urethane plug 12 is then slid over the opposite end of the cable and placed into that annulus space created by the flame-treated portion of cable sheath 3 and tubular enclosure 6, so that the tapers of tubular enclosure 6 and urethane plug 12 match one another.

In a previous operation a resilient plug 12 has been molded by casting polyurethane around a compression means, namely ring 8 and elongated members 10. In this manner, a good bond of the urethane to the elongated members 10 is assured. Elongated members 10 are welded to annulus compression ring 8 prior to this casting step.

The urethane plug assembly, compression means and plug per se, is situated on that portion of cable sheath 3, which has been flame treated. See reference numeral 5. During this procedure, the elongated members 10 will enter two holes formed in one terminal opening of tubular enclosure 6 and extend beyond a sufficient length to allow retaining ring 9 to be bolted into position by nuts 11. When the nuts 11 are tightened, urethane plug 12 will be compressed and distorted so that a mechanical bond is produced on the aforementioned tapers inside the tubular enclosure 6, and between the flame-treated portion 5 of cable sheath 3 and the bore of the urethane plug 12. At the completion of the operations aforesaid, the thus assembled assembly is ready to progress to wiring of the coils 15.

Coils 15 are placed in molds and encapsulated to form blocks of a desired dimension. The encapsulating material can be any thermohardenable material, for example an epoxy capable of being cured at room temperature by means of catalytic action and the like. Coils 5 have leads protruding from an upper surface for wiring to the cable conductors 2. After wiring, blocks of conductors are strapped (fixedly assembled) so as to retain a square configuration, the length thereof governed by coil count requirements as well as case size requirements. A fiberglass case 14 is then slid over the strapped blocks of coils and bonded, on the tapered surface of 17, to tapered surface of 13 of the tubular enclosure 6. Such bonding, is accomplished by well-known adhesives and is allowed to set before further work is performed.

After the bonding of case 14 to tubular enclosure 16 has been completed, the entire unit is placed in an inverted position and a hole 16 is provided (drilled) in the bottom of case 14, to allow an encapsulating pour of the thermohardenable resin (epoxy to be made. The epoxy is poured through this hole until the entire unit becomes full. Hole 16 is then sealed with bonding adhesive and allowed to set. The pour of epoxy will extend all the way through case 14 and into tubular enclosure 6 and terminate at an interface with the urethane plug 12. It will also surround and bond to the serrated portion of the cable stub sheath. See Element 4. In this manner, both a mechanical bond and epoxy dam of the cable conductors has been achieved. Because of the depth of the urethane plug in combination with the epoxy dam, no external cable stub support is required.

From the foregoing comment, it is believed that the invention may be readily understood by those skilled in the art without further description, it being borne in mind that numerous changes may be made in the details of the disclosed without the departing from the spirit of the invention as set forth in the following claims:

I claim:

1. An electrical cable terminal, adapted to be connected to a container, comprising:
   a. at least one insulated electrical conductor peripherally surrounded by a plastic sheath having first and second terminal portions;
   b. said first and second terminal portions being peripherally surrounded by, spaced apart from, and forming an annular space between themselves and an enclosure having at least one sidewall forming at least in part first and second spaced apart openings;
   c. a compressed resilient plug occupying that part of said annular space formed in part by said second terminal portion;
   d. a plastic mass occupying that part of said annular space formed in part by said first terminal portion;
   e. an annulus abutting said resilient plug and circumscribing said cable sheath, and
   f. at least two elongated members extending from said annulus and lying approximately parallel to the longitudinal axis of said cable sheath and terminating at a point outside of one of said spaced-apart openings.

2. A cable terminus as defined in claim 1 wherein at least one means for drawing said annulus closer to said one of said openings is disposed on terminal portions of said elongated members.

3. A terminus as defined in claim 1 wherein there is at said one of said openings an inwardly protruding end wall integral with said enclosure sidewall.

4. A terminus as defined in claim 3 wherein said compressed resilient plug abuts against said inwardly protruding end wall.

5. An electrical cable terminus, adapted to be connected to a container, comprising:
   a. at least one insulated electrical conductor peripherally surrounded by a tubular plastic sheath, a terminal portion of which has a surface comprised of first serrated and second flame treated zones;
   b. said terminal portion being at least partially peripherally surrounded by and spaced apart from and forming an annular space between it and a tubular enclosure having a sidewall forming first and second spaced-apart openings, said first opening being larger than said second opening and said sidewall converging from said first to said second opening;
   c. a compressed resilient plug occupying that part of said annular space formed in part by the second zone of said tubular plastic sheath terminal portion;
   d. a plastic mass occupying that part of said annular space formed in part by said first zone of said plastic sheath terminal portion; and
   e. an annulus abutting said resilient plug and circumscribing said cable sheath, and at least two elongated members extending from said annulus and lying approximately parallel to the longitudinal axis of said cable sheath and terminating at a point outside of said second opening.

6. A terminus as defined in claim 5, wherein at least one means for drawing said annulus closer to said second opening is disposed on a terminal portion of each of said elongated members.

7. A terminus as defined in claim 5 wherein there is at said second opening an inwardly protruding end wall integral with said tubular enclosure sidewall.

8. A terminus as defined in claim 7, wherein said compressed resilient plug abuts said inwardly protruding end wall.

9. An electrical cable terminal, adapted to be connected to a container, comprising:
  a. at least one insulated electrical conductor peripherally surrounded by a plastic sheath;
  b. said plastic sheath being peripherally surrounded by, spaced apart from, and forming an annular space between itself and an enclosure having at least one sidewall and forming at least in part first and second spaced-apart openings;
  c. a compressed resilient plug occupying said annular space;
  d. an annulus abutting said resilient plug and circumscribing said cable sheath, and
  e. at least two elongated members extending from said annulus and lying approximately parallel to the longitudinal axis of said cable sheath and terminating at a point outside of one of said spaced-apart openings.

10. A cable terminus as defined in claim 9 wherein a plastic mass occupies at least a portion of said annular space.

11. A terminus as defined in claim 9 wherein at said second opening, there is an inwardly protruding end wall integral with said enclosure sidewall and wherein said resilient plug abuts against said end wall.

12. An electrical cable terminal assembly adapted to be secured to a container and comprising a cable having at least one insulated electrical conductor and a plastic sheath peripherally surrounding said conductor, an enclosure having a tubular wall peripherally surrounding an end portion of said cable, said sheath and said tubular wall delimiting an annular space within said enclosure, and said sheath terminating at one end within the region delimited by said tubular wall, said enclosure being formed at one end of said tubular wall with an opening through which said cable extends, and at least a portion of said tubular wall converging in a direction extending from the opposite end of said tubular wall to said one end of said tubular wall, a resilient plastic plug received in said annular space and peripherally surrounding a first region of said end portion, said first region of said end portion being axially spaced from said one end of said sheath, said plug being peripherally surrounded by said portion of said tubular wall and being tapered in the direction in which said portion of said tubular wall converges, a plastic mass disposed in said annular space and peripherally surrounding the region of said end portion extending between said first region and said one end of said sheath, and means supported by said enclosure for selectively applying an axial compressive force to said plug for distorting said plug.

* * * * *